3,359,211
BLUE-WHITE EUROPIUM ACTIVATED ALUMINO-SILICATE PHOSPHOR
Philip M. Jaffe, Nutley, N.J., assignor to Westinghouse Electric Corporation, East Pittsburgh, Pa., a corporation of Pennsylvania
No Drawing. Filed Oct. 12, 1964, Ser. No. 403,389
7 Claims. (Cl. 252—301.4)

ABSTRACT OF THE DISCLOSURE

Aluminosilicate matrix is activated by europium to provide a blue-white emitting phosphor.

This invention relates to phosphor materials and, more particularly, to improved phosphor materials which are particularly adapted for use with discharge devices.

Phosphor materials which have good response to excitation by relatively short wavelength ultraviolet radiations, such as 2537 A.U., have utility in conjunction with fluorescent lamps, where the phosphor material converts the ultraviolet radiations into visible radiations. Such phosphors can be used either singly or in a blend to produce new color effects, or for making a lamp having improved brightness with a desired color.

Some other types of discharge devices produce longer wavelength radiations, such as 3650 A.U., and phosphor materials which respond to such radiations are useful with such discharge devices.

It is the general object of this invention to provide an improved phosphor material which responds brightly to excitation either by short wavelength or long wavelength ultraviolet excitation.

It is another object to provide phosphor material which responds to ultraviolet radiations to produce a bright blue-white emission.

It is a further object to provide phosphor material which responds with a blue-white emission and which phosphor can be used in conjunction with fluorescent lamps or with other discharge devices which generate long wavelength ultraviolet radiations.

The foregoing objects of the invention, and other objects which will become apparent as the description proceeds, are achieved by providing a phosphor composition having an alumina-silica matrix which is activated by europium. Composition constituent ranges are provided as well as preferred modes of preparation.

While the phosphor material of the present invention is particularly adapted for use with discharge devices, it should be understood that the phosphor can be used in any application where it is desired to convert ultraviolet radiations into visible radiations, such as a display which is painted with fluorescent material.

The present phosphor composition has the formulation $x\text{Al}_2\text{O}_3 \cdot (1-x)\text{SiO}_2 : y\text{Eu}$, wherein $x$ is permissibly from 0.05 to 0.8 and $y$ is permissibly from 0.0015 to 0.15. The preferred range for $x$ is from 0.25 to 0.5. The preferred range for $y$ is from 0.015 to 0.125. In preparing the phosphor, hydrated aluminum oxide and silicic acid are mixed in the form of a slurry in the relative gram-mole proportions desired in the phosphor and europium can be added to the slurry in the form of europium nitrate in such amount as desired in the phosphor. As a specific example, 0.3 gram mole of $\text{Al}_2\text{O}_3$ in the form of hydrated aluminum oxide is mixed with 0.7 gram mole of silica in a form of silicic acid, along with 0.01 gram atom of europium added as europium nitrate. The slurry is dried and then fired in a silica crucible, preferably in an ammonia atmosphere. Nitrogen can be used for the firing atmosphere, although a brighter emission is obtained with the ammonia firing atmosphere.

Different compositions can be obtained depending upon the firing temperature and the raw-mix composition. When the firing temperature is from 900° C. to 1400° C., with the phosphor fired for at least fifteen minutes, the resulting phosphor has a blue-white emission and a white body color, but it does not display the "mullite" crystalline structure. While the mullite crystalline structure begins to form at firing temperatures of from 1400° C. to 1480° C., this does not appear to alter the fluorescent properties of the phosphor.

When the phosphor raw-mix contains aluminum oxide and silica in the respective gram-mole ratios of 6:4, and the phosphor raw mix is fired at a temperature of between 1480° C. and the decomposition temperature of mullite for at least fifteen minutes, the phosphor matrix displays the crystalline structure of mullite. In all cases, the phosphor emission is blue-white and it responds brightly both to 2537 A.U. excitation and 3650 A.U. excitation. The phosphor is also responsive to excitation by ultraviolet radiations which are of a wavelength intermediate the 2537 A.U. and 3650 A.U. radiations.

When excited by 2537 A.U. excitation, the present phosphor has a brightness comparable to that of calcium tungstate which has a similar color. Under 3650 A.U. excitation, the phosphor is brighter than the best commercially available silver-activated zinc sulfide. Thus the phosphor has utility in a variety of applications. For response to 2537 A.U. excitation, the $0.3\text{Al}_2\text{O}_3 \cdot 0.7\text{SiO}_2$ matrix is preferred. For response to 3650 A.U. excitation, the $0.4\text{Al}_2\text{O}_3 \cdot 0.6\text{SiO}_2$ matrix is preferred.

The europium activator concentration is the same whether the phosphor is prepared by firing at relatively low temperatures such as from 900° C. to 1480° C., or whether it is fired at the higher temperatures of between 1480° C., and the decomposition temperature of mullite. In either case, the phosphor should be fired for a period of at least 15 minutes. When the phosphor is fired at the lower temperature range of from 900° C. to 1480° C., the lower the firing temperature within this range, the longer the firing time should be for best results.

It will be recognized that the objects of the invention have been achieved by providing a phosphor material which has a blue-white emission and which is responsive both to 2537 A.U. and to 3650 A.U. Such phosphor has been used in fluorescent lamps and in other discharge devices, as well as other applications where it is required to convert ultraviolet radiations into visible radiations.

In copending application S.N. 403,349, filed concurrently herewith by the present inventor, titled "Green Phosphor" and owned by the present assignee, is disclosed a europium-activated europium aluminate. In copending application S.N. 403,136, filed concurrently herewith by the present inventor, titled "Green-Yellow" phosphor, and owned by the present assignee, is disclosed a $\text{EuAl}_2\text{Si}_2\text{O}_8$ phosphor.

While best embodiments of the invention have been illustrated and described in detail, it is to be particularly understood that the invention is not limited thereto and thereby.

I claim:

1. A phosphor composition having the formulation $x\text{Al}_2\text{O}_3 \cdot (1-x)\text{SiO}_2 : y\text{Eu}$, wherein $x$ is from 0.05 to 0.8 and $y$ is from 0.0015 to 0.15.

2. The phosphor as specified in claim 1, wherein during phosphor preparation, the phosphor raw mix is fired in an ammonia atmosphere at a temperature of from 900–1480° C. for at least fifteen minutes, with the lower the firing temperature the longer the firing time.

3. The phosphor as specified in claim 1, wherein $x$ is from 0.25 to 0.5 and $y$ is from 0.015 to 0.125.

4. The phosphor as specified in claim 1, wherein $x$ is 0.3 and $y$ is from 0.0015 to 0.15.

5. The phosphor as specified in claim 1, wherein $x$ is 0.3 and $y$ is from 0.015 to 0.125.

6. The phosphor as specified in claim 4, wherein during phosphor preparation, the phosphor raw mix is fired in an ammonia atmosphere at a temperature of between 1480° C. and the decomposition temperature of mullite for at least fifteen minutes.

7. The phosphor as specified in claim 6, wherein $y$ is from 0.015 to 0.125.

References Cited

UNITED STATES PATENTS 3,250,722   5/1966   Borchardt _____ 252—301.5

OTHER REFERENCES

De Ment: Fluorochemistry, 1945, page 430.
Kroger: Some Aspects of the Luminescence of Solids, 1948, pp. 291–292.

TOBIAS E. LEVOW, *Primary Examiner.*

R. EDMONDS, *Assistant Examiner.*